Dec. 11, 1951   J. E. BRANDENBERGER   2,578,626
APPARATUS FOR WRAPPING PLASTIC CONFECTIONS
Filed Dec. 7, 1949   8 Sheets-Sheet 1

Inventor
Jacques Edwin Brandenberger
By *J. J. Leek*
Atty.

Dec. 11, 1951  J. E. BRANDENBERGER  2,578,626
APPARATUS FOR WRAPPING PLASTIC CONFECTIONS
Filed Dec. 7, 1949  8 Sheets-Sheet 3

Inventor
Jacques Edwin Brandenberger
By
Atty.

Inventor
Jacques Edwin Brandenberger

Fig. 22.

Inventor
Jacques Edwin Brandenberger
By (signature)
Atty.

Patented Dec. 11, 1951

2,578,626

UNITED STATES PATENT OFFICE 2,578,626

APPARATUS FOR WRAPPING PLASTIC CONFECTIONS

Jacques Edwin Brandenberger, Paris, France, assignor to Societe La Cellophane (Swisse), Basel, Switzerland, a Swiss body corporate Application December 7, 1949, Serial No. 131,683
In Great Britain December 17, 1948

17 Claims. (Cl. 93—3)

This invention relates to methods, and apparatus, for producing wrapped articles of a thermoplastic nature, and more particularly to the production of wrapped bars of chocolate.

It is the object of this invention to produce high-grade chocolates in which the desired qualities of fine finish, good appearance, smooth texture free from air bubbles and uniform density are obtained in a simple and effective manner.

It is another object of this invention to produce such high-grade chocolates automatically in a continuous manner in a way which is particularly suitable for the economic manufacture of small bars of chocolate.

It is a further object to enable small bars of high-grade chocolate to be automatically and continuously produced while maintaining the weight of the bars within fine limits.

This invention uses a flexible tube which is filled with chocolate or other substance and the filled tube is operated on to produce bars of chocolate or the like which are wrapped in the tube material. The invention is directed to smoothing the surface of the filled tube and to imparting a regular cross-sectional shape to it in a simple manner which enables bars of uniform size to be economically made at a high speed.

It is yet a further object of this invention continuously to fill a flexible tube with chocolate in a plastic state, the tube being given a generally flat cross-section and being acted on to remove surface irregularities and occluded air and to give the flat tube a regular cross-sectional shape, the tube being then acted on to form separate bars of chocolate.

Another object of the present invention is directed to dividing the smoothed tube of chocolate into bars and maintaining a uniform size of bar with a smooth surface.

The present invention is also concerned with apparatus for continuously manufacturing wrapped bars of chocolate and an object of this invention is directed to the provision of an apparatus in which the thickness of the bars is adjustable in a simple manner both to maintain it constant and to vary the thickness of the bar initially.

The preferred construction of an apparatus for continuously producing wrapped bars of chocolate (and the method of making the bars by the apparatus) will now be described, by way of example only, with reference to the accompanying drawings whereof.

Figures 1, 2, 3, 4, 5, 6, 7, 8, 9, 10, 11, 12:
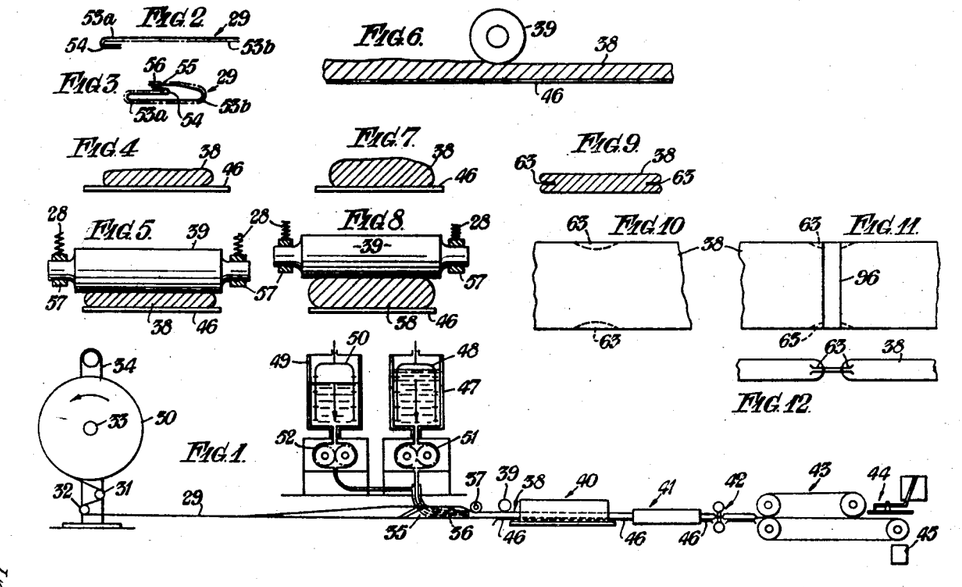
Figure 1 is a schemmatic view of the complete apparatus.
Figure 2 is a diagrammatic view of one form of the wrapping material.
Figure 3 is a diagrammatic view showing the material of Figure 2 folded to form a tube.
Figures 4 to 12 inclusive are views showing diagrammatically the main steps of manufacture carried out by the apparatus of Figure 1.

Referring to Figure 1: a strip 29 of wrapping material is continuously drawn from a supply roll 30 and over a tensioning means 31, 32. The roll 30 is on a horizontal axle 33 carried by a standard 34. The strip 29 is fed into a folding device 35 where it is wrapped over a nozzle 36. The edges of the strip are folded over on top of the nozzle and are engaged thereon by a roller 37 to seal the edges and form a tube. The tube is filled with chocolate (as described in detail later) by nozzle 36, while the chocolate is warm and plastic, to form a band.

The band of chocolate, which is generally indicated by the reference numeral 38, passes beneath an equalising roller 39 and is then led through a cooler in the form of a long, straight tunnel 40. The cooled tube is delivered to an indenting mechanism 41, pressing mechanism 42, a smoothing mechanism 43, cutting mechanism 44 and so to a conveyor 45 which receives the finished wrapped bars of chocolate.

The band of chocolate is supported as it passes through the apparatus on a plate 46 and on the floor of the tunnel cooler 40.

The chocolate delivered to the tube may be of a wide variety of forms, for example, a plain, milk or other chocolate alone may be used or, as shown in the apparatus of Figure 1, a chocolate and a centre may be supplied at the same time. The centre filling is contained in a hopper 47 which is suitably heated and has a stirring paddle 48. The chocolate is in hopper 49 and is heated and stirred by paddle 50.

A pump 51 is provided to deliver the filling from hopper 47 to nozzle 36 and a pump 52 is provided to deliver the chocolate from hopper 49 to the nozzle. The pumps are controlled as hereinafter described in detail.

The nozzle 36 comprises a pair of concentric pipes so that the filling from hopper 47 is delivered to the wrapping tube enveloped by chocolate from hopper 49.

The wrapping material 29 may be regenerated cellulose foil which is coated with various cellulose derivatives, gums, resins and waxes and is preferably a lamination of regenerated cellulose foil 53a with metal foil 53b (see Figures 2 and 3). One edge (54) of the strip of foil is reverted so that when the strip is wrapped to form the tube, the surfaces which are brought into contact for sealing are both surfaces of the regenerated cellulose lamination 53a. It is preferred that the lamination 53a carry a thin thermoplastic coat on its outer surface: such a coat, for example of nitrocellulose, is commonly applied to regenerated cellulose foil to waterproof the foil. Adhesion between the regenerated cellulose laminations can thus be affected merely by the application of heat and gentle pressure.

Such a heat-sealing arrangement is the roller 37. The nozzle 36, which has a rectangular discharge opening of a width several times its height, has a substantially flat upper surface and the overlapping edges of the regenerated cellulose lamination 53a passes over the surface and beneath roller 37. The roller 37 is heated in any convenient or known way and is spring pressed against the flat upper surface of nozzle 36. To avoid any danger of the pressure of the roller causing an unsightly deformation of the wrapping material, the roller may be closely mounted between two rollers of only very slightly less diameter, so that the extent of the depression possible by the central roller is restricted. These two rollers may conveniently be of heat insulating material so that loss of heat from the central roller is reduced. The amount of pressure exerted by the central roller may conveniently be controlled, for example, by means of one or more adjustable springs exerting their action on the axle of the roller.

The heat-sealed joint is shown in Figure 3 at 55 and it will be noted that there is a narrow unsealed strip 56 projecting just beyond the joint. This enables the wrapping to be easily removed from the final product by providing a part which may be gripped between the fingers to tear off the seal. The tube which is thus produced is of a flexible nature and is therefore readily shaped, deformed, indented and so on but it will not readily tear or rupture during manufacture of the chocolate bars.

Instead of the two-ply strip 29 described above a three-ply strip may be used comprising a metal foil sandwiched between two regenerated cellulose foils. The three-ply strip does not require that one edge be reverted but this form of multiple foil is somewhat expensive.

The tube will be given a rectangular cross-sectional form by nozzle 36 and the tube is filled with chocolate so that the filled tube is of a generally flat cross-section (Figures 4 and 7). If the tube were to be filled to an optimum mass of chocolate per unit of length of the tube, the latter would assume a circular cross-section and would have a smooth surface but, for several reasons, this is considered undesirable and is not done according to this invention. Instead, as shown in Figures 4 and 7, the tube is filled with chocolate so that the filled tube is of a generally flat cross-section i. e. the mass per unit of length is at all times substantially less than that which would result in the tube being given a circular shape. The filled tube of Figures 4 and 7 is not of regular shape and does not have a smooth surface as required in high-grade chocolates and to produce these desirable features the filled tube, while supported by plate 46, is passed beneath an equalizing roller 39. This roller extends transversely of the tube at least over its full width (Figures 5 and 8). The roller is freely mounted for rotation in bearings 57 and is urged by springs 28 towards plate 46 but is arranged to be spaced at a specified distance from the plate.

The roller 39 will press on the tube and remove surface irregularities therefrom without changing the mean cross-sectional area of the filled tube and it will also give the tube a regular cross-sectional shape, as shown in Figure 6. Air (if any) is pushed ahead of the roller and expelled from the tube.

The tube is delivered from roller 39 as a continuous flat band having a regular shape and a smooth surface. The mass of the chocolate in tube 38 per unit of length of the band is also substantially constant.

In the particular arrangement being described the roller 39 is cylindrical, the plate 46 is flat and the distance between them is uniform so that the band of chocolate is generally of rectangular cross-section but with uniformly rounded convex edges (Figures 5 and 8). Alternatively, the roller 39 and plate 46 may have slightly concave surfaces so that the band of chocolate is of flat, elliptical shape in cross-section with uniformly rounded convex edges.

The amount of chocolate delivered to the tube per unit of length is readily adjustable (as later described in greater detail) and the distance between roller 39 and plate 46 may be correspondingly altered. The thickness of the chocolate band 38 is increased in this way—thus, the tube of Figure 7 has approximately twice as much chocolate per unit of length as the tube of Figure 4. Nevertheless, the final shape of the band after passing beneath roller 39 is uniform, of constant density and has a smooth surface.

The smoothed band is delivered to the cooler 40 and leaves the cooler with a plasticity that is determined by the operations which are subsequently to be performed.

The cooled band may be cut transversely, in any convenient or known manner, into bars. Alternatively, and preferably, the band is continuously subjected to a series of operations whereby individual bars of chocolate are produced, each of which is completely enveloped by the tube material. These operations will now be described in detail.

The band from cooler 40 is conveyed to the indenting mechanism 41 and is there passed between a pair of flat endless steel ribbons 58 (Figures 13 and 14) which engage the edges of the band and apply pressure thereto. Each ribbon 58 passes around a pair of discs 59, 60 and it is arranged, as is clear from Figure 14, that the distance between the ribbons 58 decreases slightly in the direction of movement of the band of chocolate. The band is supported by plate 46 while passing through mechanism 41.

The ribbons are slotted (as at 61) at regular intervals and each disc 59 has three equi-spaced projections 62 which are adapted to pass through slots 61. The projections 62 engage opposite edges of the chocolate band, and, having less thickness than that of the band (see Figure 13) they indent the edges of the band to form pairs of opposite grooves 63 (Figures 9 and 10) at regular intervals. The function of these grooves will be explained shortly.

When indenting the chocolate band as described its upper surface is engaged by a plate 64 which is spring-urged to engage the tube and prevent the flattened surfaces of the tube being spoilt by displacement of the chocolate.

Figures 13, 15:
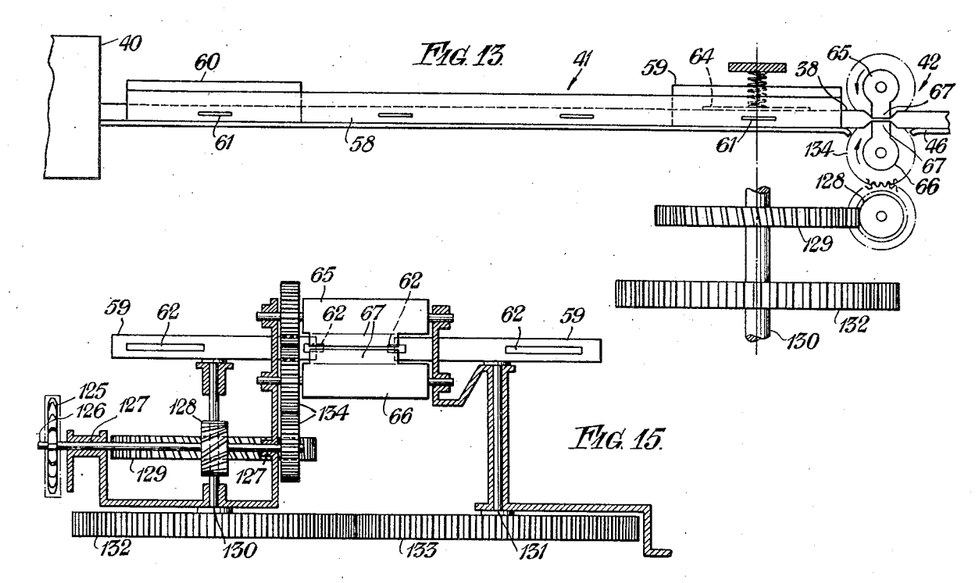
Figures 13 and 14 are respectively side and plan views of an indenting mechanism which forms part of the apparatus of Figure 1.
Figure 15 is a transverse section showing the gear transmission to the indenting mechanism of Figures 13 and 14.

The indented band is delivered to the pressing mechanism 42 comprising a pair of rollers 65, 66 each having a single flat-topped ridge 67 arranged so that the flat tops engage each other (Figure 13). The ridges 67 press the flattened surfaces of the tube closely together to form a closure strip 96.

This pressing operation, if performed without indenting the band at 63, results in its width being locally increased at the closure strip. Indentations 63, however, carry the tube material inwardly as shown in Figure 9 so that this material is not available to increase locally the width of the band in the manner indicated. The indentations 63 thus ensure that this undesirable effect of the pressing operation is counteracted and the width of the band is maintained substantially constant.

Chocolate will be pushed out from beneath the ridges 67 and will raise the flattened surfaces of the band near the strip 96. Accordingly the band is delivered to the smoothing mechanism 43 to disperse said raised portions.

Mechanism 43 comprises a pair of endless chain assemblies 68, 69 which are suitably supported on drums 74, 75, 76, 77 so arranged that over a part of their length both chains lie side-by-side and travel together in the same direction as band 38. Chains 68, 69 carry projecting bars 70, 71 respectively at regular intervals, the bars extending transversely and arranged to co-operate in pairs (see Figure 16). A guide plate 72 is provided for each chain, the chain engaging the guide by rollers 73. The guides 72 prevent the chains separating and ensure that each pair of bars 70, 71 is pressed together. The drums 74—77 rotate about a horizontal axis i. e. chain 68 lies above chain 69.

The chains 68, 69 are driven in synchronism with the band of chocolate which is fed between them so that each pair of bars 70, 71 engage one on each side of strip 96 and clamps it firmly between them. To this end bars 70 are faced with rubber. The bars 70, 71 will therefore ensure that the strip 96 is undistributed during the smoothing operation.

Figure 16:
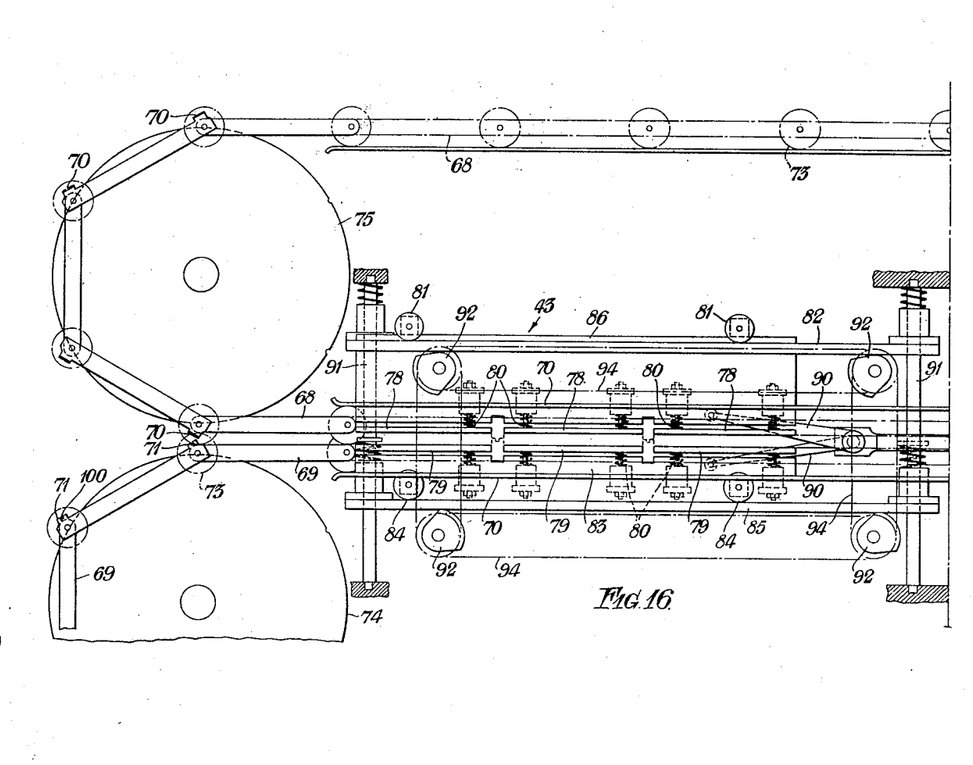
Figure 16 is a side view of a smoothing mechanism of the apparatus of Figure 1, parts being shown in section.

In the arrangement being described it is provided that three portions of band 38 separated by four strips 96 be smoothed at the same time. The chain assemblies 68, 69 are arranged as shown in Figure 16 so that the bars 70, 71 simultaneously clamp six successive strips 96 between them.

A pair of plates 78, 79 engage the flattened surfaces of each portion of the band 38 between them, the plates being urged towards each other by springs 80. The three plates 78 are carried by a reciprocating carriage 86 having wheels 81 which run on a pair of parallel guide rails 82. The three plates 79 are carried in a similar manner by carriages 83 which runs on wheels 84 along the rails 85.

The carriages 83 and 86 are reciprocated in the lengthwise direction of the band 38 by a heart-shaped cam 87. The cam is engaged on diametrically opposite sides by follower 88 and the followers are on a common slider 89 which is connected by links 90 with the carriages 83, 86.

The rails 82, 85 are supported by pillars 91 and each rail is engaged at its ends by a cam 92, all the cams of the group being of the same shape and being driven together (see Figure 1) through sprockets 93 and chains 94. The rails 82, 85 are urged against cams 92 by springs 95. The cams 92 will raise the rails 82, 85 which will be spring returned so that carriages 83 and 86 are reciprocated in a direction normal to the direction of movement of band 38. The carriages are, at the same time, reciprocated by cam 87 and the effect is that the carriages, and the smoothing plates 78, 79 which they carry, continuously perform a circular movement during part of which the pairs of plates engage the band 38 and squeeze it between them while the band and plates are travelling together. Having smoothed both flattened surfaces of three portions of the band the plates 78, 79 are moved apart and returned to repeat the smoothing operation.

It may be arranged that such portion of the band is smoothed only once but the arrangement of the drawings is preferred where it is engaged successively three times by the pair of plates 78, 79 i. e. it is smoothed three times.

The chocolate displaced by plates 78, 79 is pressed by them into the rounded edges of the band and against the strips 96. The entire edge formation of each portion of the band will therefore be uniform, smooth and of good appearance. The flattened surfaces will be smooth and free from ridges.

Figure 17:
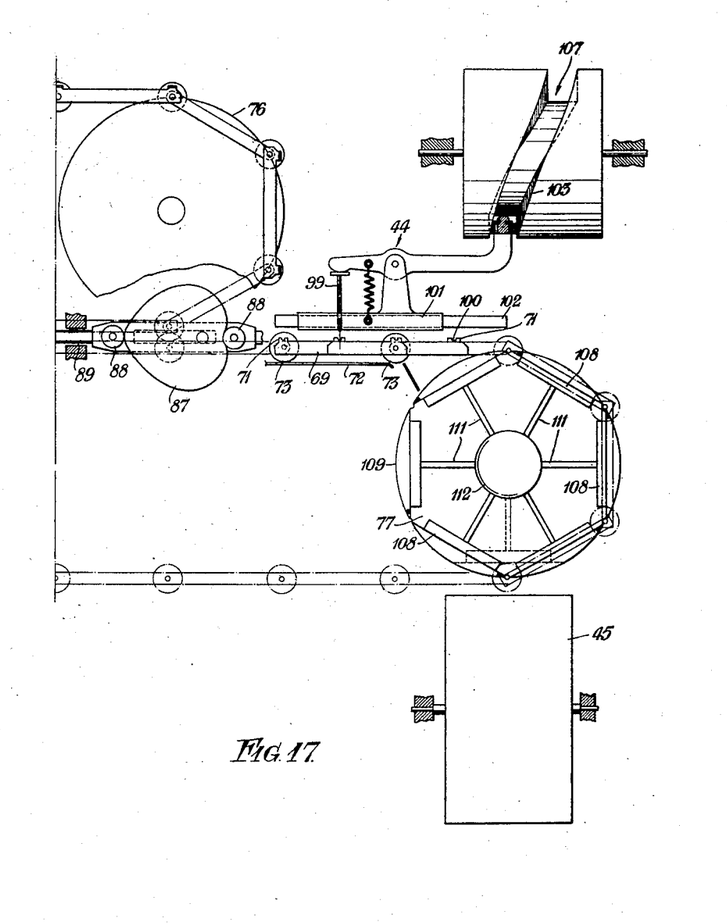
Figure 17 is a side view of a cutting and delivery mechanism which form part of the apparatus of Figure 1.
Figure 18:
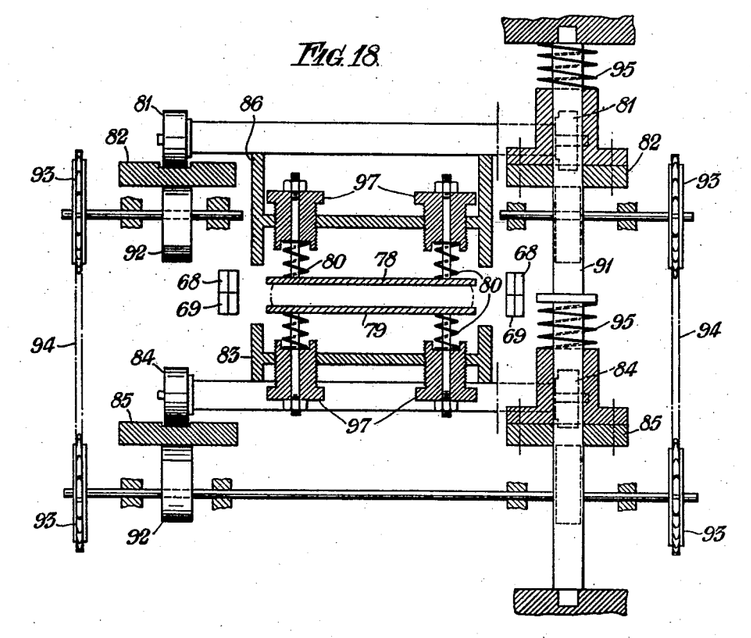
Figure 18 is a transverse section of the smoothing mechanism of Figure 16.

The pairs of smoothing plates 78, 79 are adjustable on their carriages 83, 86 (so that the minimum distance between pairs of plates is selectable within limits) by the nuts 97 (Figure 17).

The lower chain 69 extends beyond the upper chain 68 (Figure 17) at the delivery end of the smoothing mechanism and supports the band during the tube-cutting operation to produce the individual bars of chocolate.

Figure 19:
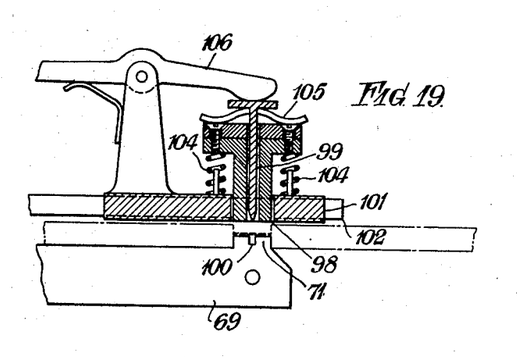
Figures 19 and 20 are respectively side and plan views (the former partly in section) of the blade-operating means of the cutting mechanism of Figure 17.
Figure 20:
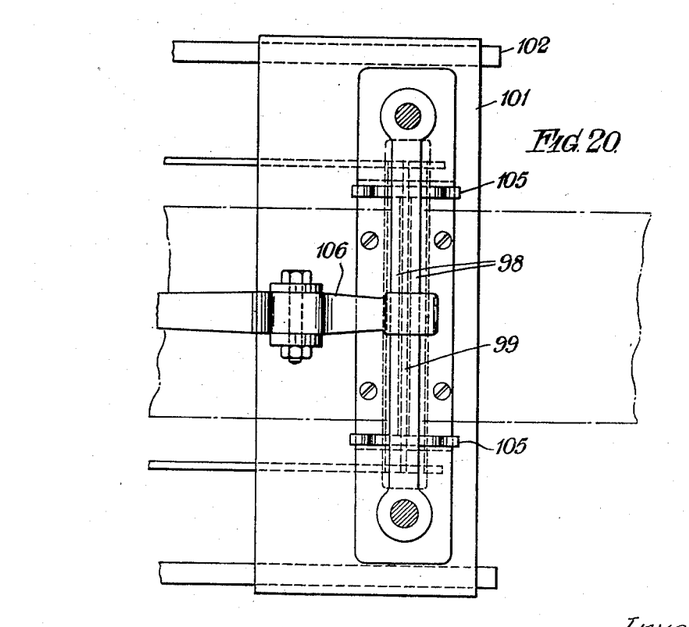

The tube-cutting means comprises a pressure plate 98 to engage successively with each closure strip 96 over its full length as the strip rests on a bar 71 of chain 69 and a blade 99 passing centrally through the plate 98 (Figures 19 and 20) to cut the strip 96 lengthwise in two. Each bar 71 has a groove 100 to receive the cutting edge of the blade 99 so that it is not damaged.

The plate 98 and blade 99 constitute an assemblage which is mounted on a carriage 101 for reciprocation along guides 102 above chain 69. The carriage is reciprocated by a cam 103 which is driven in synchronism with the moving band of chocolate so that the blade is carried along with the band during the cutting operation.

The plate 98 and blade 99 are independently spring-urged away from the chocolate band, the rate of the blade spring 105 being greater than that of the plate spring 104. An oscillating lever 106 engages the blade and the cause of the selected spring rates will successively move the plates 98 and blade 99 towards the band.

The carriage 101 is reciprocated and the lever 106 is oscillated by the single cam 103 which is of the scroll type having a diametral lift on surface 107.

The band of chocolate is thus cut into lengths each of which is a completely wrapped bar of chocolate. Each individual bar is delivered by chain 69 into a shallow tray 108 the trays being carried around the periphery of a drum 109 which rotates about a horizontal axis. A wrapped bar of chocolate enters a tray while it is at the top of the drum 109 and is retained therein by suction till the tray is at the bottom of the drum when it is delivered (the tray having been inserted) into either a carton or on to the conveyor 45 to be taken to the inspection, finishing, labelling, overwrapping, packaging and despatch departments. Suction is applied to each tray 108 by a pipe 111 which connects with a central vacuum chamber 112 to which a vacuum pump is applied.

In another construction of the smoothing mechanism the chains 68, 69 are replaced by endless steel bands carrying transverse bars to engage the closure strip as described above. The steel bands are suitably supported so that the bars will be clamped to the strip 96 in pairs, and on each side.

The steel bands pass round drums and are perforated along either or both edges to be engaged by pins or teeth carried by the drum whereby the bands are driven without slip.

The lower steel band is of greater length than the upper band and the cutting operation is performed on the extended portion as described above.

Figures 14, 21:
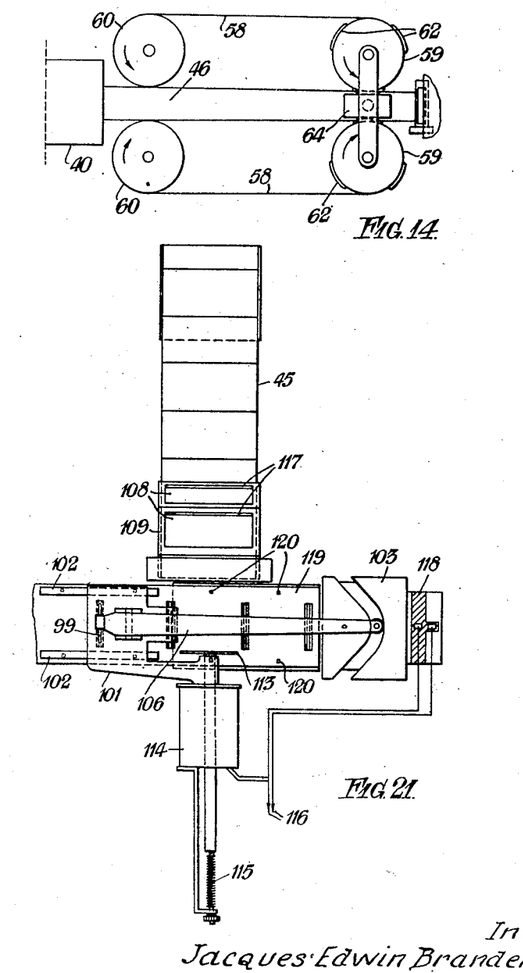
Figure 21 is a plan view of an alternative arrangement of delivery mechanism to that shown in Figure 17.

In Figure 21 there is shown an alternative construction of delivery mechanism in which each individual bar of chocolate, as it is cut from the band of chocolate, is pushed sideways against bar 117 and into a suction tray 108 on drum 109. The bar is carried round in the tray and delivered to the conveyor 45 to be taken to the inspection or other department. The bar is retained in the tray by suction as set forth above.

The pusher 113 for delivering the bars to the trays 108 is moved sideways by a solenoid 114 and is returned by spring 115. The solenoid 114 is energised from a source of potential 116 through a rotary switch 118 carried by scroll cam 103 so that pusher 113 is moved in time with the cutting operation.

Figure 21 also shows part of the lower of the pair of steel bands referred to above. The steel band is indicated at 119 and has holes 120 along both edges. The holes are engaged by pins on drums (not shown) over which the band passes and by which it is driven without slip.

The carriage 101, slides 102, lever 106 and blade 99 are also shown in Figure 21. This cutting mechanism operates as already described. It will be noted that the solenoid is carried by carriage 101 so that it moves with each wrapped bar as it is carried forward by band 119.

Figure 22:
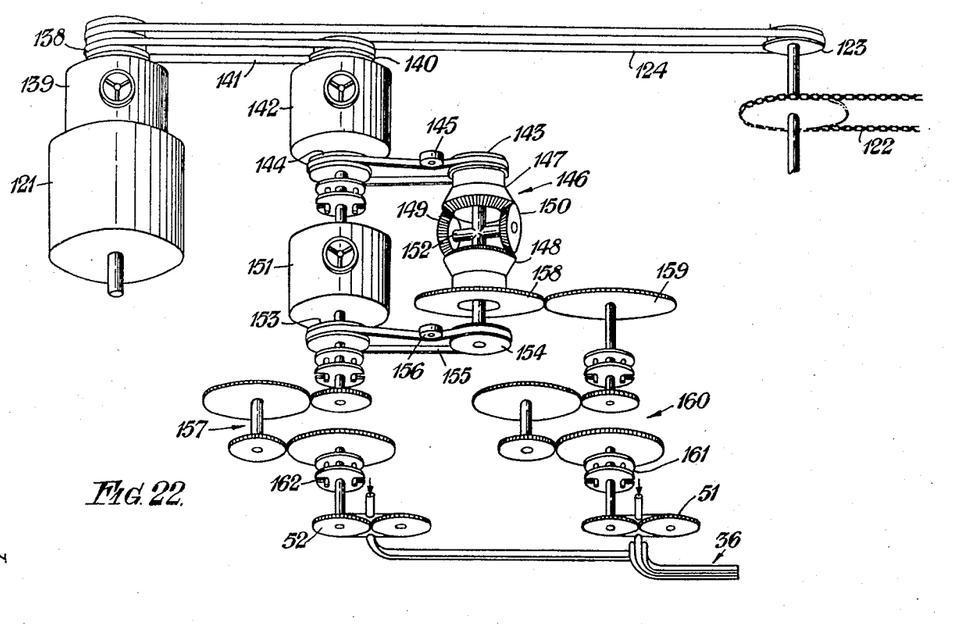
Figure 22 is a diagrammatic perspective view of a particular form of driving mechanism for the apparatus of Figure 1.

The indenting, pressing, smoothing, cutting and delivery mechanisms 41, 42, 43, 44 and 45 respectively are all synchronised and this is done by driving all these various mechanisms from a single motor 121 (Figure 22). The transmission to the mechanisms is by chain 122 which is driven by pulley 123 and belt 124.

Where convenient part of the transmission may be common to two or more mechanisms. Thus, as shown in Figure 15 the chain drive from motor 121 is applied to sprocket 125 which is mounted on shaft 126. Shaft 126 is supported in bearings 127 and carries a helical pinion 128 which meshes with a helical gear 129 on vertical shaft 130. A second vertical shaft 131 is driven by gear 129 through gear wheels 132, 133. Shafts 130, 131 carry the discs 59. Shaft 126 drives the rollers 65, 66 through spur gearing 134.

The chain drive from motor 121 is also applied to cams 92 which are connected together for synchronous operation by chains 94 (Figure 16).

It has been stated that the various mechanisms which operate in the band of chocolate are synchronised and it will also be appreciated that it is essential for the successful operation of the apparatus that the two elements (i. e., the chocolate and strip 29) which combine to form the band be effectively co-ordinated before, and as, they are brought together. Moreover, when, as in the arrangement of Figure 1, the chocolate has a filling it it necessary that the two pumps 51, 52 be capable of a strict regulation to furnish a constant ratio between the filling substance and the enveloping chocolate. Finally, it is necessary to be able to control the speed of the apparatus as a whole and, at the same time, the rate of feed of chocolate to the strip 29. In Figure 22 there is diagrammatically shown a control which achieves these various requirements. The electric motor 121 drives a compound pulley 138 through a variable-speed gear 139, the pulley 138 driving the belt 124, pulley 123 and chain 122 as described above. The pulley 138 also drives a pulley 140 by belt 141, the pulley 140 being on the input shaft of a variable-speed gear 142 which drives a differential gear, generally indicated by the reference numeral 146, through pulley 143 and belt 144. The belt is tensioned by jockey pulley 145. The differential 146 comprises sun wheels 147, 148 and planet pinions 149, 150.

The gear 142 also drives a second variable-speed gear 151 which transmits to the planet carrier 152 by pulleys 153, 154 and belt 155. The latter is tensioned by jockey pulley 156. The output shaft of gear 151 also drives pump 52 through reduction gearing generally indicated by the reference numeral 157.

The sun wheel 148 is one with a gear wheel 158 which drives pump 51 through gear 159 and a reduction gearing indicated at 160.

The arrangement of Figure 22 is that the speed of pulley 123 and hence of the indenting, pressing, smoothing, cutting and delivery mechanisms is dependent directly upon the speed of motor 121 and is adjustable by the variable-speed gear 139. The drive to pumps 51 and 52 will be correspondingly adjusted at the same time. The variable-speed gear 142 permits of adjustment of the delivery of the two pumps 51, 52 so that the mass of chocolate delivered per unit of length of strip 29 is variable as described above with reference to Figures 4, 5, and 7, 8. Finally the relative proportions of the individual outputs of pumps 51, 52 is variable by adjustment of the gear 151.

The control described has the advantage of enabling the relative proportions of the filling and chocolate to be varied while maintaining a constant delivery from both pumps. The range of variation is preferably such that either pump 51 or 52 may be rendered inoperative in which case a single substance is fed through nozzle 36. Alternatively, pumps 51, 52 may be stopped by disconnecting clutch 161, 162 respectively.

The tube may be heat-sealed at strips 96 during their formation or subsequently thereto. Thus, the rollers 65, 66 may be heated in any convenient or known manner.

The ridge 67 of roller 65 may be faced with rubber.

The degree of accuracy which is attainable with the apparatus described will be appreciated from the fact that in the continuous and automatic production of high-grade bars of chocolate of 25 grammes weight each, the weight of the bars does not vary beyond ±2%.

I claim:

1. Apparatus for producing wrapped bars of chocolate of uniform shape and constant weight comprising a nozzle having a delivery end of rectangular cross-section and a rectangular discharge opening, means for continuously drawing a strip of the wrapper material past the nozzle, means for folding the longitudinal edges of the moving strip round the nozzle to make a flexible tube of generally flat shape, means for continuously filling the moving tube with chocolate so that the filled tube remains generally flat, smoothing elements to press continuously on the flat surfaces of the chocolate filled tube whereby surface irregularities and occluded air are moved from the tube and the flat tube is given a regular cross-sectional shape, means for cooling the tube to bring the chocolate to a desired plastic condition, a pair of discs the peripheries of which engage opposite edges of the tube, at least one peripheral projection, of a thickness less than the thickness of the tube, on each disc, said projections forming pairs of opposite grooves, at regular intervals along the tube, a pair of rollers, at least one flat-topped, lengthwise extending ridge on each roller, the ridges being arranged to engage in pairs to press the flat surfaces of the tube together to form a closure strip across each pair of grooves, a pair of horozontal endless chains, between an upper and lower part of which the chocolate tube passes, projecting bars at regular intervals along the chains, pairs of which engage opposite sides of the closure strips, at least one pair of plates to press on and smooth the flat surfaces of the tube between the next adjacent closure strips, and means to cut the tube at the closure strips, the lower chain extending beyond the upper chain to carry the tube to the tube-cutting means.

2. Apparatus as claimed in claim 1 wherein the tube-cutting means comprises a plate to engage successively with each closure strip as it rests on a bar of the lower chain, a blade to cut said strip lengthwise in two and a common operating means to press the plate against the strip and to cut the band with the blade.

3. Apparatus according to claim 2 in which the pressure plate and blade are independently spring-urged away from the tube, the rate of the blade spring being greater than that of the plate spring and a cam-operated lever engages the blade successively to move the plate and blade to engage the tube.

4. Apparatus as claimed in claim 3 wherein the plate and blade are carried by a carriage which reciprocates in the direction of movement of the tube so that the plate and blade follow the continuous forward movement of the tube during the cutting operation and is then returned to cut the next following closure strip, said carriage and the blade being both moved by said lever which is driven by a scroll cam having a diametral lift.

5. Apparatus as claimed in claim 4 in which the wrapped and severed bars of chocolate are delivered each to a tray, carried by a drum rotating about a horizontal axis, while the tray is at the top of the drum and is retained therein by suction till the tray is at the bottom of the drum when it is delivered from the tray.

6. Apparatus for producing wrapped bars of chocolate of uniform shape and constant weight comprising a nozzle having a delivery end of rectangular cross-section and a rectangular discharge opening, means for continuously drawing a strip of the wrapper material past the nozzle, means for folding the longitudinal edges of the moving strip round the nozzle to make a flexible tube of generally flat shape, means for continuously filling the moving tube with chocolate so that the filled tube remains generally flat, smoothing elements to press continuously on the flat surfaces of the chocolate filled tube whereby surface irregularities and occluded air are moved from the tube and the flat tube is given a regular cross-sectional shape, means for cooling the tube to bring the chocolate to a desired plastic condition, a pair of discs the peripheries of which engage opposite edges of the tube, at least one peripheral projection, of a thickness less than the thickness of the tube, on each disc, said projections forming pairs of opposite grooves at regular intervals along the tube, a pair of rollers, at least one flat-topped, lengthwise extending ridge on each roller, the ridges being arranged to engage in pairs to press the flat surfaces of the tube together to form a closure strip across each pair of grooves, a pair of horizontal endless chains, between an upper and lower part of which the chocolate tube passes, projecting bars at regular intervals along the chains, pairs of which engage opposite sides of the closure strips, at least one pair of plates to press on and smooth the flat surfaces of the tube between the next adjacent closure strips, and means to cut the tube at the closure strips, the lower chain extending beyond the upper chain to carry the tube to the tube-cutting means, a pump to deliver the chocolate to the nozzle, a common motor to drive the pump and the indenting, pressing, smoothing and cutting means, a variable-speed gear to drive the pump by the motor to vary the mass of chocolate delivered to the strip per unit of length thereof.

7. Apparatus for producing wrapped bars of chocolate of uniform shape and constant weight comprising a nozzle having a delivery end of rectangular cross-section and a rectangular discharge opening, means for continuously drawing a strip of the wrapper material past the nozzle, means for folding the longitudinal edges of the moving strip round the nozzle to make a flexible tube of generally flat shape, means for continuously filling the moving tube with chocolate so that the filled tube remains generally flat, smoothing elements to press continuously on the flat surfaces of the chocolate filled tube whereby surface irregularities and occluded air are moved from the tube and the flat tube is given a regular cross-sectional shape, means for cooling the tube to bring the chocolate to a desired plastic condition, a pair of discs the peripheries of which engage opposite edges of the tube, at least one peripheral projection, of a thickness less than the thickness of the tube, on each disc, said projections forming pairs of opposite grooves at regular intervals along the tube, a pair of rollers, at least one flat-topped, lengthwise extending ridge on each roller, the ridges being arranged to engage in pairs to press the flat surfaces of the tube together to farm a closure strip across each tube together to form a closure strip across each pair of grooves, a pair of horizontal endless chains, between an upper and lower part of which the chocolate tube passes, projecting bars at regular intervals along the chains, pairs of which engage opposite sides of the closure strips, at least one pair of plates to press on and smooth the flat surfaces of the tube between the next adjacent closure strips, means to cut the tube at the closure strips, the lower chain extending beyond the upper chain to carry the tube to the tube-cutting means, a pair of concentric pipes constituting said nozzle through which chocolate and a chocolate filling are each supplied to the wrapping tube, a separate pump to deliver the chocolate and filling each to a supply pipe, a variable-speed gear to drive each pump, a main variable-speed gear to drive said pump variable-speed gears and the indenting, pressing, smoothing and cutting means and a common motor to drive said main variable-speed gear.

8. Apparatus for producing wrapped bars of chocolate of uniform shape and constant weight comprising a nozzle having a delivery end of rectangular cross-section and a rectangular discharge opening, means for continuously drawing a strip of the wrapper material past the nozzle, means for folding the longitudinal edges of the moving strip round the nozzle to make a flexible tube of generally flat shape, means for continuously filling the moving tube with chocolate so that the filled tube remains generally flat, equalizing elements to press continuously on the flat top and bottom surfaces of the chocolate filled tube whereby surface irregularities and occluded air are removed from the tube and the flat tube is given a regular cross-sectional shape without materially decreasing the mean cross-sectional area of the filled tube, means for cooling the tube to bring the chocolate to a desired plastic condition, a pair of discs the peripheries of which engage opposite side edges of the tube, at least one peripheral projection of a thickness less than the thickness of the tube on each disc, said projections forming pairs of opposite grooves in said side edges at regular intervals along the tube, means for pressing the flat top and bottom surfaces of the tube together to displace the chocolate mass and bring the two sides of the wrapper into close contact for forming a closure strip across said tube registering with each pair of opposite grooves, and means for cutting the tube into bars at the closure strips.

9. Apparatus as claimed in claim 8 in which the tube is conveyed to the indenting discs between endless bands which engage the side edges of the tube and apply pressure thereto, the bands passing round the discs and having slots through which the indenting projections pass to engage the tube.

10. Apparatus as claimed in claim 9 in which the bands converge slightly in the direction of movement of the chocolate filled tube.

11. Apparatus as claimed in claim 10 wherein the tube rests on a plate as it is conveyed between the indenting discs and is engaged on its upper surface, by a spring-pressed plate during the indenting operation.

12. Apparatus according to claim 8 in which the chocolate tube is delivered from the pressing means to a mechanism having means to hold the closure strips closed and to smooth the flat top and bottom surfaces of the tube.

13. Apparatus as claimed in claim 12 wherein said mechanism comprises a pair of endless chains between which the chocolate tube passes, projecting bars at regular intervals along the chains, pairs of which engage opposite sides of the closure strips and at least one pair of plates to press on and smooth the flat top and bottom surfaces of the tube between the next adjacent closure strips.

14. Apparatus as claimed in claim 13 wherein the smoothing plates are carried by a reciprocating carriage which is mounted for movement on a guide which is reciprocable in a direction normal to the direction of movement of the carriage, the pairs of plates being spring-urged towards each other.

15. Apparatus according to claim 14 wherein the carriage runs on a pair of parallel guide rails which are reciprocated in synchronism by cams driven from the motor which drives the indenting, pressing and smoothing mechanisms.

16. Apparatus as claimed in claim 12 wherein the chocolate is delivered to the strip through a nozzle by a motor-driven pump and the means for drawing the strip past the nozzle is also driven by said motor, there being a variable-speed gear to drive the pump by the motor to vary the mass of chocolate delivered to the strip per unit of length thereof.

17. Apparatus as claimed in claim 16 in which chocolate and a chocolate filling are each delivered through concentric supply pipes to the tube strip by a pump driven by said motor, the transmission to the pumps incorporating a variable-speed gear which is controllable to vary the relative proportions of the filling and the chocolate.

JACQUES EDWIN BRANDENBERGER.

REFERENCES CITED

The following references are of record in the file of this patent:

UNITED STATES PATENTS

| Number | Name | Date |
| --- | --- | --- |
| 1,719,635 | Trauger et al. | July 2, 1929 |
| 1,810,740 | Vogt | June 16, 1931 |
| 1,810,862 | Vogt | June 16, 1931 |
| 1,810,863 | Vogt | June 16, 1931 |
| 2,027,545 | Mapes | Jan. 14, 1936 |
| 2,142,505 | Gammeter | Jan. 3, 1939 |
| 2,156,466 | Vogt | May 2, 1939 |
| 2,340,260 | Clunan | Jan. 25, 1944 |
| 2,420,983 | Salfisberg | May 20, 1947 |
| 2,505,384 | Burstiner | Apr. 25, 1950 |